Jan. 20, 1959  J. T. BEESTON, JR  2,869,311
BLADE FOR ROTARY LAWN MOWER
Filed Nov. 14, 1956  2 Sheets-Sheet 1
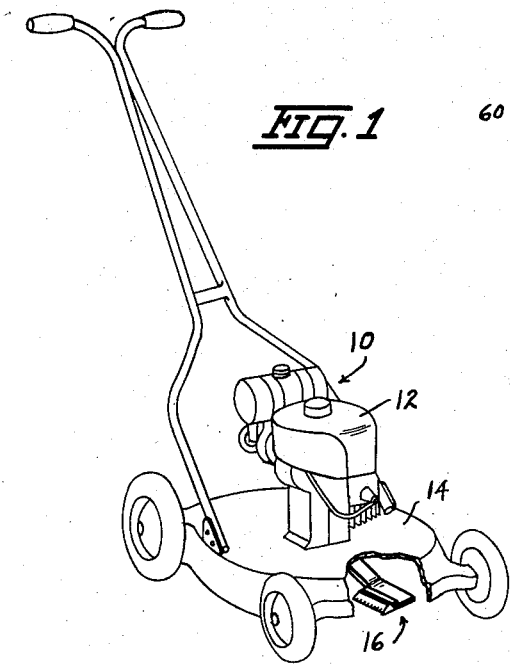
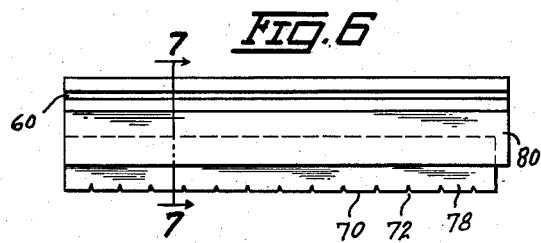
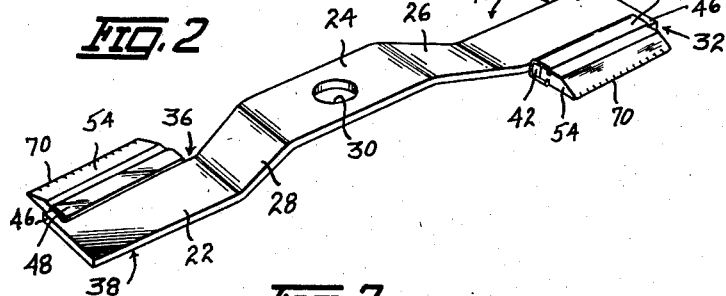
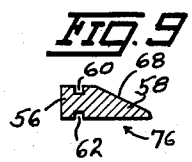
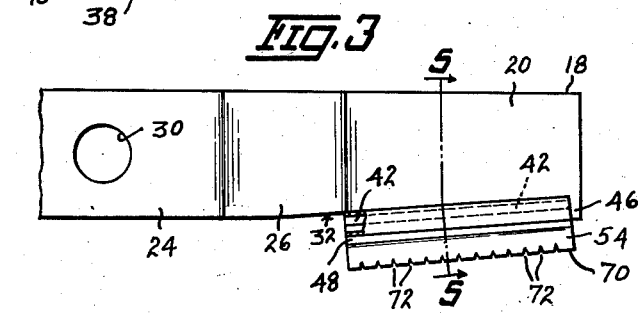
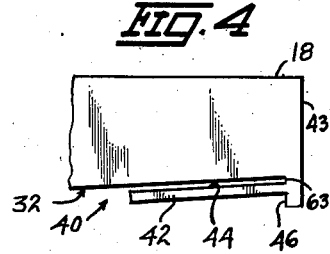
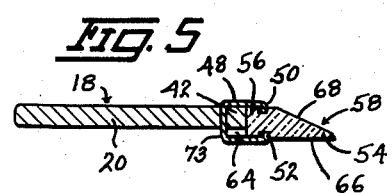
INVENTOR.
JOHN T. BEESTON, JR.
BY Morton S. Adler
ATTORNEY.

Jan. 20, 1959 — J. T. BEESTON, JR — 2,869,311
BLADE FOR ROTARY LAWN MOWER
Filed Nov. 14, 1956 — 2 Sheets-Sheet 2
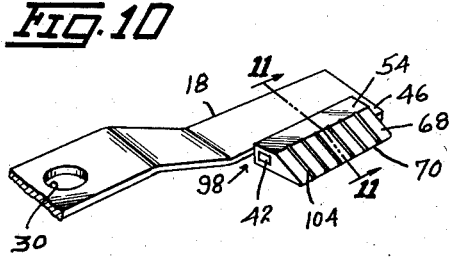
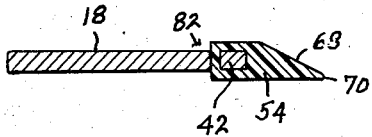
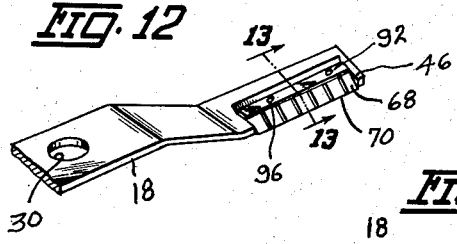
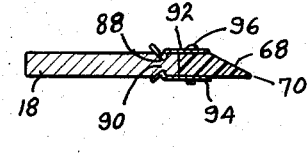
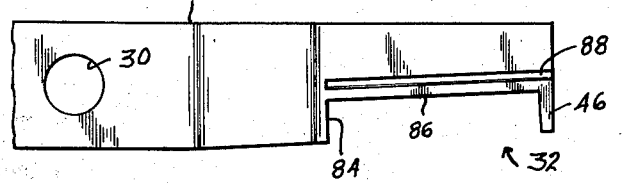
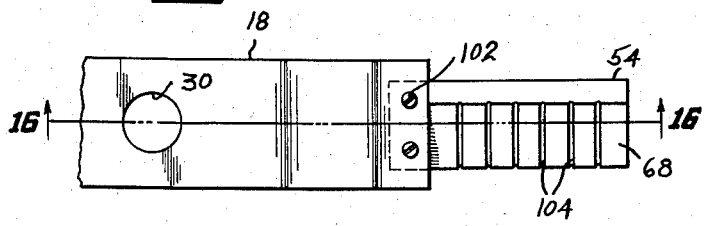
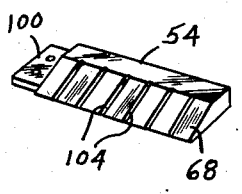
INVENTOR.
JOHN T. BEESTON, JR.
BY
ATTORNEY.

United States Patent Office 2,869,311
Patented Jan. 20, 1959

2,869,311

BLADE FOR ROTARY LAWN MOWER

John T. Beeston, Jr., Des Moines, Iowa, assignor to Frontier Development Company, Des Moines, Iowa, a corporation of Iowa Application November 14, 1956, Serial No. 622,074

9 Claims. (Cl. 56—295)

My invention relates to blades for rotary type power lawn mowers.

Such mowers presently employ a steel blade attached for rotation to the motor shaft and while their efficiency is not questioned, they are subject to chipping, nicking and breaking when they hit foreign objects such as stones, sticks, etc., with the result that frequent sharpening or replacement is necessary which is relatively a costly matter.

It is thus an important object of this invention to provide an effective but economical and replaceable blade for this type of mower.

More particularly this invention contemplates a blade holder or support member for attachment to the motor shaft, with such holder designed for receiving an expendable cutting blade that can be easily attached or removed and thus save not only the expense of sharpening or replacing the present type relatively heavy blade, but also the time involved in doing so.

Another object inhering herein is the provision of a ceramic blade with a serrated cutting edge for mounting to the blade holder as set forth above.

A still further object of this invention is to provide novel means for attaching the blade to the blade holder so as to utilize centrifugal force in maintaining the blade in place during operation.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

Fig. 1 is a perspective view of a rotary type power lawn mower in light lines and broken away in part to show in heavy lines the general relationship of my new blade, Fig. 2 is a perspective view of a preferred embodiment of this invention, Fig. 3 is a top view of one of the cutting edges on this blade to show its construction in more detail, Fig. 4 is a fragmentary view of the blade supporting portion on the support member, Fig. 5 is a cross sectional view taken on the line 5—5 of Fig. 3, Fig. 6 is an enlarged elevational view showing a modified form of detachable blade, Fig. 7 is a cross sectional view taken on the line 7—7 of Fig. 6, Figs. 8 and 9 are respective cross sectional views of a blade shaped as in Fig. 5 but shown made from different materials.

Fig. 10 is a fragmentary perspective view showing one end of the blade holder with a modified blade attaching means, Fig. 11 is a cross sectional view taken on the line 11—11 of Fig. 10, Fig. 12 is a perspective view similar to Fig. 10 showing a further modified form of this invention, Fig. 13 is a cross sectional view taken on the line 13—13 of Fig. 12, Fig. 14 is a fragmentary top view showing a modified end portion for the blade holder, Fig. 15 is a fragmentary top view of one end of the blade holder showing a modified blade and means for attaching the same, Fig. 16 is a longitudinal sectional view taken on the line 16—16 of Fig. 15, and, Fig. 17 is a perspective view of the blade shown in Figs. 15 and 16.

Referring to the drawings a rotary type power lawn mower of common design is indicated generally by the numeral 10. It will be understood that a vertically disposed shaft (not shown) extends from the motor 12 below the base platform 14 and it is to such shaft that the usual steel blade is attached for rotation in a horizontal plane. This invention is designed to replace the usual blade by my new blade indicated generally at 16.

It should be pointed out that while this blade has been more particularly developed for the type of mower illustrated in Fig. 1 wherein the blade 16 is attached to a vertically disposed shaft, it is not intended to limit its application thereto, since similar types of rotating cutter blades are in use on horizontally disposed shafts and no deviation in principle is involved by using this invention in either case.

Member 16 comprises an elongated rigid support bar or holder 18 of steel or any other suitable material capable of withstanding shock from hitting foreign objects such as stones and the like. End portions 20 and 22 are on a lower plane than the elevated central portion 24 due to the inclined portions 26 and 28 respectively at each side of portion 24. The central portion 24 is provided with an opening 30 by which blade 16 will be mounted to the motor shaft below platform 14 and secured in any suitable manner. Thus mounted, it will be understood that blade 16 will rotate horizontally in a manner similar to blades now in use. However, blade 16 is not itself a cutting blade and thus need not be of a material capable of taking and holding a cutting edge.

Assuming that bar 16 will rotate in a clockwise direction the end portion 20 will have the respective leading 32 and trailing 34 edges and likewise end portion 22 will have the corresponding leading 36 and trailing 38 edges. As shown in Figs. 3 and 4 each of the leading edges 32 and 36 is angled slightly to the rear from the respective inner portions of end 20 and 22 to the outer extremity so that the width of portions 20 and 22 at their free ends is somewhat less than their width near portion 24. The leading edges 32 and 36 are provided with a cutting blade retaining means shown generally at 40 in Fig. 4 which comprises an arm 42 integral with the outer edge 43 of bar 18 and extending therefrom, parallel to the respective leading edges 32 and 36 and being spaced therefrom by the slot 44. An integral shoulder 46 projects forwardly from the leading edges and perpendicular to one end of arm 42 as shown in Fig. 4.

A generally C shaped blade holder or housing 48 for mounting in retaining means 40 is substantially square in cross section (Fig. 5), with its open end portions defining oppositely disposed spaced shoulders 50 and 52. A cutting blade 54, preferably of ceramic material, has a cross section shape as shown in Figs. 5, 7, 8 and 9 which includes a neck portion 56 and a head portion 58. Blade 54 is the same length as holder 48 and has oppositely disposed longitudinal notches or grooves 60 and 62 in the neck portion 56 to register with shoulders 50 and 52 of holder 48. In this way, blade 54 is slidable into holder 48 from either end with shoulders 50 and 52 seating in the respective notches 60 and 62 as in Fig. 5. Thus arranged, neck 56 of blade 54 will be inside of holder 48 and head portion 58 will be outside. It will be noted that neck 54 does not occupy all space within holder 48, but leaves a passageway 64 (Fig. 5) which has a width just sufficient to receive arm 42. Holder 48 can thus be mounted on arm 42 (Fig. 3) so that one end abuts closed end 63 of slot 44, and the adjacent end of blade 54 abuts the shoulder 46 on bar 18. In this position the bottom 66 of blade 54 is on a horizontal plane and the top side 68 is beveled so as to slant upwardly and rearwardly from its cutting edge 70 which is provided with the serrations 72.

It is pointed out that the closed side 73 of holder 48 opposite the shoulders 50 and 52 has a thickness substantially the same as the width of slot 44 (Fig. 5) so that force from crashing blows against rocks or the like on the blade 54 are transmitted directly through arm 42 and holder 48 to the bar 18. This is an important factor since the blade retaining means 40 must be such to withstand these sudden impacts and still retain its shape so that blades 54 can be changed quickly and easily and without the necessity of making repairs to the retaining means 40. The construction of the blade retaining means 40 as disclosed has demonstrated satisfactorily the ability to transfer this impact shock into bar 18 without becoming distorted.

Another feature of means 40 resides in its construction to utilize centrifugal force developed at high angular velocities of the bar 18 in such a manner that holder 48 with blade 54 therein will tend to seat tighter in retaining means 40, with holder 48 bearing against the closed end 63 of slot 44 and blade 54 bearing against shoulder 46 as pointed out previously. This is obviously a safety feature to eliminate the possibility of the replaceable blades becoming dislodged and flying off during the cutting operation. It also avoids the necessity for any special securing means to hold the blades in cutting position and thus the blades are under no internal strains which are present when separate securing means are used to attach such blades to a blade holder.

The cutting blade 54 must be formed to make a clean cut and to lift the severed grass or the like out of the way of oncoming pieces. The serrations 72 on the cutting edge of blade 54 reduce the tendency of grass to slide along the blade without being cut and the beveled surface 68 lifts the severed piece out of the way. Thus blade 54 has been preferably shaped in cross section as shown but it will be understood that other shapes may be used that provide the same results.

While blade 54 may of course be formed from a wide variety of materials that will do a satisfactory cutting job such as plastic 74 (Fig. 8), steel or the like 76 (Fig. 9) and a thin steel blade 78 (Figs. 6 and 7) inlaid in a plastic base 80, such materials are still relatively expensive for use as "throwaway" blades which is one of the purposes of this invention. I have thus preferably used a ceramic blade 54 (Fig. 5) which can be formed in a manner well known in the art to hold a sharp cutting edge for a reasonable length of time, and which is also extremely economical to fabricate so that it can be discarded if chipped or broken on a solid object such as a rock or the like.

It will be understood that bar 18 should be properly balanced to prevent or keep at a minimum any vibrations in its high speed rotation and uniformity in the mass of the replaceable blades 54 should also be maintained to assure a balanced cutting unit that will give a smooth operation.

With reference now to Figs. 10-17 inclusive, I wish to describe certain modifications relating to means for attaching the cutting blade to the holder which do not deviate from the principle of operation. In these modified forms, like numerals will be used for like parts as previously described.

In Figs. 10 and 11, the bar 18 is the same as in Figs. 2 and 4 but the blade 54 is here formed with a longitudinal passageway through the rear portion 82 and parallel to the cutting edge 70. This passageway is shaped in cross section complementary to arm 42 of socket 40 and arm 42 is received therein the same as in passageway 64 shown in Fig. 5. In this way, holder 48 is eliminated without any change in function. Thus arranged, one end of blade 54 will abut both the closed end of slot 44 and shoulder 46 to utilize centrifugal force as previously described.

In Figs. 12, 13 and 14, bar 18 is provided on its leading edge 32 with an elongated notch 84 that provides the recessed edge 86. Parallel to edge 86 and spaced slightly therefrom are oppositely disposed grooves 88 and 90 in the respective top and bottom of bar 18. Shoulder 46 remains as before in a more elongated shape. Blade 54 is the same shape in cross section as in Fig. 5, but without any grooves or passageways as previously described. A pair of resilient clip members 92 and 94 are attached to the respective upper and lower surfaces of blade 54 by rivets 96 so as to project rearwardly where they are crimped as shown in Fig. 13 so as to be spaced apart a distance less than the thickness of bar 18. Thus arranged, blade 54 is attached to bar 18 by snapping the crimped portions of clips 92 and 94 into the respective grooves 88 and 90. By virtue of slot 84, the cutting edge 70 of blade 54 will be substantially flush with the leading edge of bar 18 and blade 54 will likewise abut shoulder 46 as before. This arrangement eliminates the corner 98 (Fig. 10) which is present in some other illustration that could possibly catch grass or weeds.

In Figs. 15, 16 and 17, I have eliminated blade retaining means 40 (Fig. 4) and attached blade 54 in endwise alignment to bar 18 by means of a flange 100 on the blade which is secured to the outer end portion of bar 18 by screws 102 or the like.

In Figs. 10-17 the serrations 72 are provided as before on cutting edge 70 of blade 54 and I have also provided the beveled surface 68 of the blade with parallel grooves 104 spaced in alignment with the serrations.

It will be understood that the element of expendability together with quick and easily attachment and removal are present in these modified forms to the same extent as previously described.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A replaceable blade for a power driven rotary type lawn mower, comprising a bar adapted for operable attachment to said mower so as to rotate in a horizontal plane about a central axis, a leading and trailing edge on one end portion of said bar, an elongated blade retaining arm integral at one end with said leading edge and disposed in parallel spaced relationship thereto, a blade holder slidably embraceably disposed on said retaining arm, and a cutting blade removably mounted in said blade holder.

2. A device as defined in claim 1 wherein said cutting blade is made wholly of ceramic material.

3. A device as defined in claim 1 in which the cutting edge of said cutting blade is provided with serrations.

4. A replaceable blade for a power driven rotary type lawn mower, comprising a bar adapted for operable attachment to said mower so as to rotate in a horizontal plane about a central axis, a leading and trailing edge on one end portion of said bar, a blade retaining means integral with said leading edge, said blade retaining means comprising an arm parallel to and spaced from said leading edge and integral with the outer end of said leading edge to define a slot intermediate said leading edge and said arm that is closed at the outer end portion of said bar, an elongated C shaped blade holder having its open end portions defining oppositely disposed spaced shoulders, an elongated cutting blade having a neck and head portion respectively, opposite sides of said neck portion having longitudinal grooves, said blade removably mounted in said holder by slidably engaging said grooves with said shoulders whereby said neck portion is disposed within said holder, said neck portion spaced from the closed side of said C shaped holder to form a passageway therethrough, and said holder slidably embraceably mounted on said arm wherein said arm is positioned in said passageway and the closed side of said C shaped holder is in said slot intermediate said leading edge and said arm.

5. A replaceable blade for a power driven rotary type lawn mower, comprising a bar adapted for operable attachment to said mower so as to rotate in a horizontal plane about a central axis, a leading and trailing edge on one end portion of said bar, a blade retaining means integral with said leading edge, said blade retaining means comprising an arm parallel to and spaced from said leading edge and integral with the outer end of said leading edge to define a slot intermediate said leading edge and said arm that is closed at the outer end portion of said bar, an elongated C shaped blade holder having its open end portions defining oppositely disposed spaced shoulders, an elongated cutting blade having a longitudinal groove on respective opposite sides, said blade removably mounted in said holder by slidably engaging said grooves with said shoulders, and said holder slidably embraceably mounted on said arm.

6. A device as defined in claim 5 characterized by one end of said holder abutting the closed end of said slot intermediate said leading edge and said arm to utilize centrifugal force in maintaining said holder on said arm during rotation of said bar.

7. A releasably mounted power driven cutting blade, comprising a bar adapted for operable attachment to a source of power so as to rotate about a central axis, a leading and trailing edge on one end portion of said bar, an arm parallel to and spaced from said leading edge and integral with the outer end thereof, a blade holder embraceably mounted on said arm, said embraceable mounting being the only means for supporting said holder on said arm, and a cutting blade releasably mounted to said blade holder.

8. A releasably mounted power driven cutting blade, comprising a bar adapted for operable attachment to a source of power so as to rotate about a central axis, a leading and trailing edge on one end portion of said bar, an arm parallel to and spaced from said leading edge and integral with the outer end thereof, a blade holder embraceably mounted on said arm, said embraceable mounting being the only means for supporting said holder on said arm, a cutting blade, and said blade holder constructed and arranged to freely slidably receive and support said cutting blade.

9. A releasably mounted power driven cutting blade, comprising a bar adapted for operable attachment to a source of power so as to rotate about a central axis, a leading and trailing edge on one end portion of said bar, an arm parallel to and spaced from said leading edge and integral with the outer end thereof to define a slot intermediate said leading edge and said arm that is closed at the outer end portion of said bar, an elongated blade holder disposed in part in said slot and embracing said arm, a cutting blade releasably supported by said blade holder by frictional engagement therewith, and said blade holder abutting the closed end of said slot to utilize centrifugal force in maintaining said holder on said arm during rotation of said bar.

References Cited in the file of this patent

UNITED STATES PATENTS

| 754,008   | Parsons   | Mar. 8, 1904  |
| 1,033,001 | Ganzhorn  | July 16, 1912 |
| 1,622,611 | Sera      | Mar. 29, 1927 |
| 2,070,959 | Smith     | Feb. 16, 1937 |
| 2,083,103 | Steiner   | June 8, 1937  |
| 2,319,947 | Oswood    | May 25, 1943  |
| 2,576,884 | Leigh     | Nov. 27, 1951 |
| 2,592,755 | Soenksen  | Apr. 15, 1952 |
| 2,635,663 | Schmidt   | Apr. 21, 1953 |

FOREIGN PATENTS

| 339,618 | Great Britain | Dec. 10, 1930 |